United States Patent [19]

Yato et al.

[11] Patent Number: 4,963,294
[45] Date of Patent: Oct. 16, 1990

[54] METHOD OF PREPARING URANIUM DIOXIDE POWDER FROM URANIUM HEXAFLUORIDE

[75] Inventors: Tadao Yato, Mito; Hiroshi Tanaka, Omiya; Toshiaki Kikuchi, Okayama; Toshio Onoshita, Ibaraki, all of Japan

[73] Assignee: Mitsubishi Kinzoku Kabushiki Kaisha, Tokyo, Japan

[21] Appl. No.: 139,443

[22] Filed: Dec. 30, 1987

[51] Int. Cl.$^5$ .............. C09K 11/04; G21G 4/00; C01G 43/06; C01G 43/025

[52] U.S. Cl. .................. 252/636; 252/643; 252/632; 264/0.5; 423/258; 423/261; 423/254

[58] Field of Search .............. 264/0.5; 252/643, 636; 423/253, 2, 254, 3, 258, 260, 261, 266, 15; 501/152

[56] References Cited

FOREIGN PATENT DOCUMENTS

| | | |
|---|---|---|
| 0148707 | 9/1985 | European Pat. Off. |
| 2582641 | 12/1986 | France |
| 62-1581 | 1/1987 | Japan |
| 62-197318 | 9/1987 | Japan |
| 62-278128 | 12/1987 | Japan |
| 62-297215 | 12/1987 | Japan |
| 63-45127 | 2/1988 | Japan |
| 63-74916 | 4/1988 | Japan |
| 63-79725 | 4/1988 | Japan |

Primary Examiner—Howard J. Locker
Attorney, Agent, or Firm—Scully, Scott, Murphy & Presser

[57] ABSTRACT

A method of fabricating uranium dioxide ($UO_2$) powder from uranium hexafluoride ($UF_6$) is disclosed, which comprises (1) reacting $UF_6$ gas with steam with controlling the temperature of reaction between said $UF_6$ gas and said steam at a predetermined temperature within the range of 200° to 700° C., to form solid uranyl fluoride ($UO_2F_2$) and/or uranium oxide with an O/U ratio (oxygen-to-uranium atomic ratio) of 2.7 to 3, (2) dissolving said $UO_2F_2$ and/or uranium oxide in water or nitric acid to form an aqueous uranyl solution containing $UO_2F_2$ and/or uranyl nitrate ($UO_2(NO_3)_2$), (3) reacting said aqueous uranyl solution with ammonia to precipitate ammonium diuranate (ADU), (4) filtering said precipitate, (5) drying said precipitate, (6) calcining said dry precipitate, and (7) reducing said calcined precipitate, whereby controlling the characteristics of said $UO_2$ powder.

7 Claims, 1 Drawing Sheet

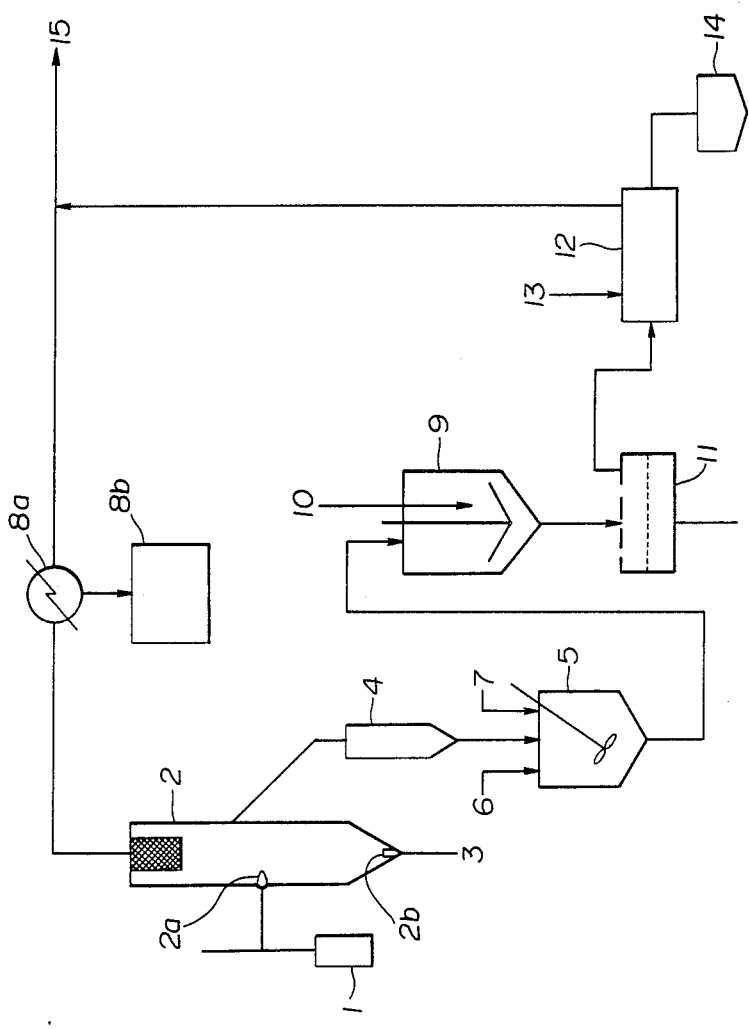

METHOD OF PREPARING URANIUM DIOXIDE POWDER FROM URANIUM HEXAFLUORIDE

BACKGROUND OF THE INVENTION

This invention relates to a method of fabricating uranium dioxide powder useful as nuclear fuel by conversion of uranium / hexafluoride, more particularly an improvement in ammonium diuranate (ADU) method.

Making a general classification of methods of converting uranium hexafluoride ($UF_6$) into uranium dioxide ($UO_2$) powder useful as nuclear fuel, there are two types of methods, i.e., wet methods and dry methods. Representative examples of the wet methods include a so-called ammonium diuranate (ADU) method in which $UF_6$ gas is reacted with water to form an aqueous uranyl fluoride ($UO_2F_2$) solution, which is then reacted with ammonia to precipitate ammonium diuranate (ADU) and the precipitate is subjected to various steps such as filtration, drying, calcination, reduction, etc. to obtain $UO_2$ powder.

Ammonium diuranate is prepared according to the following reaction schemes (I) and (II).

$$UF_6 + 2H_2O \rightarrow UO_2F_2 + 4HF \qquad (I)$$

$$UO_2F_2 + 4HF + 7NH_3 + 7H_2O \rightarrow \tfrac{1}{2}(NH_4)_2U_2O_7 + 6NH_4F + 11/2H_2O \qquad (II)$$

In the above-described method, there are four moles of hydrogen fluoride (HF) per mole of uranium (U) in the aqueous $UO_2F_2$ solution formed by the hydrolysis of $UF_6$ as shown in formula (I) above. This is disadvantageous in two respects. In the first instance, it is difficult to obtain $UO_2$ powder having the high activity by employing the above-described method.

On the first point, in the formation reaction of ADU represented by reaction scheme (II), firstly ammonium fluoride ($NH_4F$) is formed by neutralization reaction with HF, resulting in that primary grains of ADU become relatively large. $UO_2$ powder obtained by subjecting ADU composed of large primary grains to various steps such as calcination, reduction, etc. is composed of large primary grains as in the case of ADU. This means that the activity of the powder is relatively low. When sintered pellets, i.e., nuclear fuel elements, are produced from such $UO_2$ powder having a relatively low activity, the sintered density of pellets produced under ordinary conditions is about 95% TD (theoretical density) and the pellets are composed of crystals having a grain size of an order of 10 micrometers. When it is desired to obtain pellets with sintered density and grain size greater than those described above, attempts to carry out sintering at elevated temperatures or for a prolonged period of time would be successful to some extent although it is practically difficult to obtain pellets with a grain size of 40 to 50 micrometers, for example.

On the second point, fluorine (F) is at first converted into ammonium fluoride ($NH_4F$) and is contained in the filtrate after filtering off ADU precipitate. The liquid waste which contains $NH_4F$ is treated with a precipitant such as slaked lime ($Ca(OH)_2$). With this treatment fluorine component is precipitated as calcium fluoride ($CaF_2$) and ammonia ($NH_3$) is recovered and recycled. On the other hand, $CaF_2$, which is formed in a very large amount e.g., as large as about 1 ton per ton of uranium treated, is left as solid waste without being further recycled. In the conventional ADU methods, it has been difficult to obtain $UO_2$ powder having a high activity due to adverse influence of fluorine, and in addition they are disadvantageous in that a large amount of fluorides are formed as wastes.

Examples of wet methods include, besides the abovedescribed ADU method, an ammonium uranyl carbonate (AUC) method, a modified ADU method, etc. The AUC method is a method in which $UF_6$ gas is reacted with ammonia, carbon dioxide and water to precipitate ammonium uranyl carbonate (AUC) and then subjected to steps of filtration, drying, calcination, reduction, etc. substantially in the same manner as in the ADU method to obtain $UO_2$ powder. On the other hand, the modified ADU method comprises hydrolyzing $UF_6$ gas in a nitric acid solution containing a defluorinating agent to obtain an aqueous $UO_2(NO_3)_2$, purifying the solution by solvent extraction, reacting the purified solution with ammonia to form ADU and subjecting the resulting ADU to the same treatments as in the ADU method, thus converting the ADU into $UO_2$. Although these methods enable fabrication of $UO_2$ powder having activity higher than that of the powder obtained according to ordinary ADU method, they not only fail to give rise to $UO_2$ powder with a grain size of larger than about 20 micrometers but also they suffer substantially the same disadvantage as encountered in the ordinary ADU method with respect to the occurrence of fluoride wastes. More particularly, in the AUC method fluorine remains in the final product as $CaF_2$ as in the ADU method while in the modified ADU method fluorides of the defluorinating agent, e.g., aluminum fluoride when aluminum nitrate is used as a defluorinating agent, are found in the final product.

The dry method, which is excellent since it is free of the above-described defects such as formation of a large amount of fluoride waste in the wet ADU method, is represented by the following reaction schemes.

$$UF_6 + 2H_2O \rightarrow UO_2F_2 + 4HF \qquad (III)$$

$$UO_2F_2 + H_2 \rightarrow UO_2 + 2HF \qquad (IV)$$

In the above reactions, at first $UF_6$ is reacted with steam to form $UO_2F_2$ which is solid, with HF being separated as gas therefrom. Then, $UO_2F_2$ is reduced with hydrogen gas to give rise to $UO_2$ powder. In this method, all the fluorine component is recovered as HF gas in contrast to the wet method in which the fluorine component goes to liquid waste which causes the occurrence of fluoride wastes. However, according to the dry method, it is generally difficult to control the characteristics of $UO_2$ to be obtained and only $UO_2$ powder having activity lower than that of the powder from wet ADU method is obtained.

SUMMARY OF THE INVENTION

An object of this invention is to obviate the abovedescribed defects of the prior arts and to provide a method of fabricating $UO_2$ powder which method enables fabrication of $UO_2$ powder having a high activity and a highly controlled characteristics.

Another object of this invention is to provide a method in which the occurrence of fluoride wastes is minimized.

According to this invention, the above objects are attained by a method of fabricating uranium dioxide ($UO_2$) powder from uranium hexafluoride ($UF_6$), comprising (1) reacting $UF_6$ gas with steam with controlling the temperature of reaction between $UF_6$ gas and steam at a predetermined temperature within the range of 200° to 700° C., to form solid uranyl fluoride ($UO_2F_2$) and/or uranium oxide with an O/U ratio (oxygen-to-uranium atomic ratio) of 2.7 to 3, (2) dissolving said $UO_2F_2$ and/or uranium oxide in water or nitric acid to form an aqueous uranyl solution containing $UO_2F_2$ and/or uranyl nitrate ($UO_2(NO_3)_2$), (3) reacting said aqueous uranyl solution with ammonia to precipitate ammonium diuranate (ADU), (4) filtering said precipitate, (5) drying said precipitate, (6) calcining said dry precipitate, and (7) reducing said calcined precipitate, whereby controlling the characteristics of the $UO_2$ powder.

This invention thus overcomes the above-described disadvantages of the prior arts by reducing or minimizing the occurrence of fluoride wastes which would be formed in large amounts in the conventional wet method and increasing the activity of the product and enabling control of the characteristics of the product.

BRIEF DESCRIPTION OF THE DRAWING

Single figure is a diagrammatic illustration of a system for carrying out the method according to an embodiment of this invention.

DETAILED DESCRIPTION OF THE INVENTION

Hereinafter, this invention will be described with reference to single figure which is a diagrammatic illustration of the apparatus used in an embodiment of this invention.

In the figure, $UF_6$ as a starting material is vaporized in a vaporizer 1 and the resulting gas is introduced by injecting or jetting it into a fluidized bed reactor 2 through a side nozzle 2a provided on the side wall of the reactor 2. On the other hand, steam, which is used as a reaction gas and at the same time as a fluidizing gas, is introduced into the reactor 2 through a bottom nozzle 2b provided on the bottom of the reactor 2 through a conduit 3 communicating to the bottom nozzle 2b. If desired, nitrogen gas can be used as a fluidizing gas and introduced into the reactor 2 together with steam in order to improve the fluidization of the fluidized bed. In the fluidized bed reactor 2, $UF_6$ gas is contacted with steam or a mixed gas composed of steam and nitrogen gas and allowed to react with each other at a temperature of 200° to 700° C. and three types of uranium compounds are formed depending on the reaction temperature. When the reaction temperature is in the range of higher than 200° C. and not higher than 350° C., $UO_2F_2$ powder is formed. When the reaction temperature is below 200° C., $UO_2F_2$ is formed, but it takes a long time for the reaction to proceed and thus such low reaction temperature should not be used. At a little higher reaction temperature, i.e., higher than 350° C. and not higher than 500° C., mixed powder composed of $UO_2F_2$ and a uranium oxide with an O/U ratio of 3 is formed. When the reaction temperature is in the range of higher than 500° C. and not lower than 700° C. a uranium oxide with an O/U ratio of 2.7 to 3 is formed. In the third case, the higher the reaction temperature the smaller the O/U ratio. Use of reaction temperatures above 700° C. should be avoided because such high temperatures accelerate corrosion of the apparatus used. The powder produced in the reactor 2 is once stored in a hopper 4 and then is introduced into a dissolving apparatus 5 in which the powder is dissolved in water, preferably deionized water or distilled water, supplied through a water supply conduit 6 when the powder is composed of $UO_2F_2$, dissolved in nitric acid supplied through a nitric acid supply conduit 7 when the powder is mixed powder composed of $UO_2F_2$ and uranium oxide specified above or when the powder is composed of the specified uranium oxide exclusively. In the above three cases, an aqueous $UO_2F_2$ solution, an aqueous mixed solution of $UO_2F_2$ and $UO_2(NO_3)_2$, and an aqueous $UO_2(NO_3)_2$ solution are produced correspondingly. The amounts of nitric acid used in the second and third cases, respectively, are as small as possible as far as the uranium oxide is dissolved. HF gas by-produced in the fluidized bed reactor 2 is recovered as an aqueous HF solution in an HF condenser 8a and received by an HF reservoir 8b. The aqueous uranyl solution containing $UO_2F_2$ and/or $UO_2(NO_3)_2$ produced in the dissolving apparatus 5 is sent to a precipitation apparatus 9 where it is reacted with ammonia supplied through an ammonia supply conduit 10 to form ADU precipitate. The ADU precipitate is filtered and dried in a filtration and drying apparatus 11 and then sent to a calcination and reduction apparatus 12 where the precipitate is calcined and reduced with a reducing gas ($H_2$ or a mixed gas composed of $H_2$ and $N_2$) containing steam supplied through a reducing gas supply conduit 13 and converted into $UO_2$ powder. The $UO_2$ powder obtained is stored in a $UO_2$ reservoir or container 14 until use. Waste gas from the calcination and reduction apparatus 12 and off-gas from the HF condenser 8a are sent to an exhaust gas treatment system 15 which may be conventional one.

As described above, one of the features of the method of this invention is that while in the conventional wet method the entire fluorine content derived from $UF_6$, starting material, finally goes into wastes in the form of fluorides the dry type hydrolysis of $UF_6$ utilized in this invention makes it possible to recover fluorine as HF, which is useful, in amounts ranging from about $\frac{2}{3}$ to its entirety with minimizing or completely avoiding the occurrence of fluoride wastes. Another important feature of the method of this invention is that after the dry type hydrolysis of $UF_6$, the product is dissolved in water or nitric acid to form an aqueous uranyl solution containing $UO_2F_2$ and/or $UO_2(NO_3)_2$, the uranyl solution being used as a starting material for producing ADU, with the result that the characteristics of the $UO_2$ powder finally obtained can be controlled with ease. In other words, the characteristics of the $UO_2$ powder are determined mostly depending on the conditions of ADU precipitation among which particularly important is the properties of the aqueous uranyl solution. In this invention, control of the temperature of reaction between $UF_6$ and steam leads to control of the ratio of $UO_2F_2$ and uranium oxide, which ratio in turn controls the ratio of $UO_2F_2$ and $UO_2(NO_3)_2$ in the aqueous uranyl solution. When $UO_2$ powder is prepared from the $UO_2F_2$ solution or the $UO_2(NO_3)_2$ solution through ADU under similar conditions the $UO_2$ powder obtained from the $UO_2(NO_3)_2$ solutions has activity higher than that of the $UO_2$ powder derived from the $UO_2F_2$ solution. This is because the primary grains of ADU obtained from the $UO_2(NO_3)_2$ solution are smaller than those of ADU derived from the $UO_2F_2$ solution. On the other hand, from the viewpoint of the speed of crystal growth upon molding $UO_2$ powder and pellet formation by sintering the $UO_2$ powder, the $UO_2$ powder prepared using the aqueous $UO_2F_2$ solution shows crystal growth speed higher than that of the powder derived from the aqueous $UO_2(NO_3)_2$ solution. This is because $NH_4F$ is also formed when ADU is produced from the aqueous $UO_2F_2$ solution and this $NH_4F$ serves to increase agglomerability of the resulting powder. Therefore, it is possible to control fundamentally important characteristics of the $UO_2$ powder, i.e., activity and crystal growth speed, of the $UO_2$ powder at desired levels by appropriately controlling or adjusting the ratio of $UO_2F_2$ and $UO_2(NO_3)_2$ in the aqueous uranyl solution which ratio can be adjusted by appropriately selecting the temperature of reaction between $UF_6$ and steam.

This invention will be descried in greater detail with reference to example which is by way of an example and does in no way limit this invention.

EXAMPLE

A fluidized bed reactor comprising a reaction portion having a diameter of 8.3 cm was used and the operation was performed under the following conditions.

| | |
|---|---|
| Speed of $UF_6$ treatment | 5 kg U/hr. |
| Linear speed of steam gas: | 15 cm/sec. |
| Reaction temperature: | 280° C., 400° C., 700° C. |

When the product obtained in the fluidized bed apparatus was $UO_2F_2$ it was dissolved in water. On the other hand, when the product contained uranium oxide it was dissolved in nitric acid to give an aqueous uranyl solution. The aqueous uranyl solution together with ammonia water was introduced in a precipitation apparatus with adjusting pH to 10.5 to form precipitation of ADU and then the precipitate was filtered and dried. When the filtrate contained $NH_4F$ the aqueous uranyl solution was treated with slaked lime to recover the fluorine content as $CaF_2$. The ADU thus obtained was subjected to calcination and reduction in $H_2$ stream containing steam at 650° C. to convert it to $UO_2$ powder. After molding it at a compacting pressure of 4 t/cm² the $UO_2$ powder was sintered at a temperature of 1,750° C. to obtain sintered pellets, which were then examined for their ceramic processability to see if they are acceptable as nuclear fuel. On the other hand, an aqueous uranyl solution was prepared according to the conventional (ADU) method and the aqueous uranyl solution was treated in the same way as above to prepare $UO_2$ powder through ADU to finally obtain pellets for comparison. Main test conditions and test results obtained are shown in Table below.

TABLE

| | Invention | | | Conventional |
|---|---|---|---|---|
| Temperature of reaction between $UF_6$ and steam (°C.) | 280 | 400 | 700 | — |
| Reaction product | $UO_2F_2$ $UO_3$ | $UO_2F_2$ + $UO_2(NO_3)_2$ | $U_3O_8$ | — |
| Composition of uranyl solution | $UO_2F_2$ | $UO_2F_2$ + $UO_2(NO_3)_2$ | $UO_2(NO_3)_2$ | $UO_2F_2$ + HF |
| Amount of ammonia water (kgNH₃/hr) | 3.3 | 3.3 | 3.3 | 7.5 |
| Amount of $CaF_2$ (kgCaF₂/hr) | 1.4 | 0.8 | 0 | 4.7 |

TABLE-continued

| | Invention | | | Conventional |
|---|---|---|---|---|
| Specific area of $UO_2$ powder (m²/g) | 7.8 | 8.4 | 10.2 | 2.7 |
| Sintered density (% TD) | 98.4 | 98.2 | 98.3 | 95.2 |
| Crystal grain size (μm) | 34.7 | 31.3 | 20.1 | 8.8 |

From the results shown in Table above, it can be seen that in the method of this invention different products were formed at different temperatures of reaction between $UF_6$ and steam. At 280° C. $UO_2F_2$ was formed while a mixture of $UO_2F_2$ and $UO_2(NO_3)_2$ was formed at 400° C. On the other hand, $U_3O_8$ was formed at 700° C. In the method of this invention, the amount of ammonia water used for preparing ADU from the aqueous uranyl solution is not larger than half the amount used in the conventional method with sufficient effect. The amount of $CaF_2$ recovered from the filtrate after removal of the precipitate in this invention decreased according as the temperature of reaction between $UF_6$ and steam was elevated and at most about ⅓ time as large as the amount obtained in the conventional method. According to the method of this invention, it is possible to obtain $UO_2$ powder having a superior activity over that of the $UO_2$ powder prepared in the conventional method. In addition, it is possible to control the activity of the $UO_2$ powder by controlling the temperature of reaction between $UF_6$ and steam. On the other hand, from the viewpoint of crystal growth, $UO_2$ powder having a high crystal growth speed can be obtained.

As stated above, this invention enables reduction to a greater extent in the amount of by-produced fluorides which has been disposed of as wastes by recovering HF in contrast to the conventional wet method, and at the same time reduction in the amount of ammonia to half or less as much as that used in the conventional method. In addition, it is possible to obtain $UO_2$ powder having a very high activity, with control of the characteristics of powder such as activity and crystal growth speed being very easy to achieve.

What is claimed is:

1. A method of fabricating uranium dioxide ($UO_2$) powder from uranium hexafluoride ($UF_6$), comprising
    (1) reacting $UF_6$ gas with steam with controlling the temperature of reaction between said $UF_6$ gas and said steam within the range of 200° to 700° C., to form a solid uranyl fluoride ($UO_2F_2$) or uranium oxide with a O/U ratio (oxygen-to-uranium atomic ratio) of 2.7 to 3, mixtures of said uranyl fluoride and said uranium oxide,
    (2) dissolving said solid in water or nitric acid to form an aqueous uranyl solution containing said uranyl fluoride, or uranyl nitrate ($UO_2(NO_3)_2$), or mixtures of said uranyl fluoride and uranyl nitrate,
    (3) reacting said aqueous uranyl solution with ammonia to precipitate ammonium diuranate (ADU),
    (4) filtering said precipitate,
    (5) drying said precipitate,
    (6) calcining said dry precipitate, and
    (7) reducing said calcined precipitate to form $UO_2$ powder.

2. The method as claimed in claim 1, wherein said reaction between $UF_6$ gas and steam is carried out in a fluidized bed reactor.

3. The method as claimed in claim 2, wherein nitrogen gas is introduced in said fluidized bed reactor.

4. The method as claimed in claim 1, wherein said temperature of reaction between $UF_6$ and steam is controlled to a temperature higher than 200° C. and not higher than 350° C.

5. The method as claimed in claim 1, wherein said temperature of reaction between $UF_6$ gas and steam is controlled to a temperature higher than 350° C. and not higher than 500° C.

6. The method as claimed in claim 1, wherein said temperature of reaction between $UF_6$ gas and steam is controlled to a temperature higher than 500° C. and not higher than 700° C.

7. The method as claimed in claim 1, further comprising recycling hydrogen fluoride produced during said reaction between $UF_6$ and steam.

* * * * *